(12) United States Patent
Impio et al.

(10) Patent No.: US 7,899,504 B2
(45) Date of Patent: Mar. 1, 2011

(54) MOBILE COMMUNICATION UNIT WITH DISPLAY AREA WIDENING MECHANISM

(75) Inventors: Jussi Impio, Palkane (FI); Esa-Sakari Maatta, Viiala (FI); Severi Uusitalo, Hameenlinna (FI)

(73) Assignee: Nokia Corporation, Espoo (FI)

( * ) Notice: Subject to any disclaimer, the term of this patent is extended or adjusted under 35 U.S.C. 154(b) by 1305 days.

(21) Appl. No.: 11/025,084

(22) Filed: Dec. 29, 2004

(65) Prior Publication Data

US 2006/0142074 A1    Jun. 29, 2006

(51) Int. Cl.
    *G03B 17/24* (2006.01)
(52) U.S. Cl. .................. 455/575.4; 455/566; 455/90.3; 455/550.1
(58) Field of Classification Search .......... 455/550, 455/566, 575, 575.1, 575.4, 575.8, 90.3, 455/550.1, 575.3, 556.2; 345/1.1
    See application file for complete search history.

(56) References Cited

U.S. PATENT DOCUMENTS

| | | | |
|---|---|---|---|
| 6,222,507 B1 * | 4/2001 | Gouko | 345/1.1 |
| 6,573,886 B1 * | 6/2003 | Lehtinen et al. | 345/173 |
| 6,859,219 B1 * | 2/2005 | Sall | 345/1.1 |
| 7,187,363 B2 * | 3/2007 | Nguyen et al. | 345/168 |
| 7,268,491 B2 * | 9/2007 | Aksamit et al. | 313/511 |
| 7,269,450 B2 * | 9/2007 | Lee et al. | 455/575.1 |
| 7,269,451 B2 * | 9/2007 | Kwon | 455/575.4 |
| 7,375,954 B2 * | 5/2008 | Yang | 361/681 |
| 7,480,524 B2 * | 1/2009 | Moon et al. | 455/575.4 |
| 2005/0003871 A1 * | 1/2005 | Shiue et al. | 455/575.3 |
| 2005/0054397 A1 * | 3/2005 | Kim et al. | 455/575.4 |
| 2006/0003708 A1 | 1/2006 | Jantti et al. | |
| 2006/0082518 A1 * | 4/2006 | Ram | 345/1.1 |

* cited by examiner

*Primary Examiner* — John Lee
(74) *Attorney, Agent, or Firm* — Perman & Green LLP (57) ABSTRACT

A mobile communication unit having a housing with at least one longitudinal side and a display area, and, a pivotably movable cover assembly longitudinally connected to the longitudinal side of the housing, the cover assembly being pivotably or slidably movable between a closed position and an open position relative to the housing and the display area, wherein pivotal or sliding movement of the cover assembly from the closed position to the open position provides widened access to the display area of the housing.

19 Claims, 7 Drawing Sheets

MOBILE COMMUNICATION UNIT WITH DISPLAY AREA WIDENING MECHANISM

BACKGROUND OF THE INVENTION

1. Field of the Invention

The present invention relates to mobile communication units, e.g., portable telephone handsets, which are typically of at least the partially opening and/or closing type. More specifically the invention relates to enabling a telephone handset to be at least partially opened, particularly to provide for widening a display area.

2. Brief Description of Related Developments

There is an increasing trend towards smaller portable telephones, as for example to make such phones pocketable; i.e., comfortably fittable within a pocket. One common means in the art of achieving a smaller overall size for such a telephone is to configure the telephone such that it may include a folding or sliding cover for covering up the display and/or control buttons when not in use. Both sliding covers and pivotal clamshell or flip covers are widely used to protect display and/or keypad areas of existing mobile phones against unintended use and against dirt or other contamination from the environment. Such configurations have become popular in many consumer markets.

However, there also remains a general desire for having a large display area, especially for multimedia and/or interactive uses. Larger displays are desirable in many applications, such as with pictorials, graphics, in gaming, or in PDA or smartphone operations. Nonetheless, the goal of providing smaller devices runs contrary to the presentation of larger displays for these other applications. Moreover, display area usage in typical existing foldable and/or slidable mobile phones, is generally restricted, i.e., not available until the openable cover thereof has been opened; indeed, very often most if not all phone uses are typically unavailable with existing openable phones prior to the opening of the covers thereof.

SUMMARY OF THE INVENTION

Herein described is a mobile communication unit or telephone handset having a housing or base and one or more, e.g., two longitudinally hinged or two slidably attached cover members connected on one or more long sides of the base. The handset is disposed to alternately be in a closed position and an open position. In the open position, the base and cover members are arranged to allow widened access to a display area of the base.

In many embodiments, the communication unit can be operable in either or both the closed or open position. The cover members may also include a plurality of keys for entering information, the keys being accessible from either the open or closed position. In such embodiments, when in the closed position, the cover members may be disposed to at least partly cover the display area while the plurality of keys for entering information are freely accessible on the cover members.

The invention solves the problem of having a small phone with a large display area by having a cover or cover members at the side or sides of the display which can be moved to widen the display area. The cover members may be hingedly-attached, connected by bendable sidewalls or slidably attached to the housing.

The present invention may allows for operability of the phone in closed position, and/or for alternative opening and use of a widened display area in certain desirable modes, as for example during "multimedia" use modes.

BRIEF DESCRIPTION OF THE DRAWINGS

The present invention will now be explained more fully below, by way of one or more examples, in connection with one or more preferred embodiments and with reference to the drawings, in which.

DETAILED DESCRIPTION OF THE PREFERRED EMBODIMENT(S)

In the following detailed description, a mobile communication unit according to the invention in the form of a hand portable terminal or telephone, preferably a cellular/mobile phone, will be described in the preferred embodiments. The term mobile communication unit or device or terminal as used herein includes all hand portable terminals provided with a form of wireless or wired connection to a network or other terminal. Other examples of such a terminal could be a so-called smartphone, or a PDA with a Wi-Fi capability.

As shown and described here; see e.g., FIGS. 1-4, a mobile communication unit, e.g., a telephone handset 10 hereof may include at least two primary parts; namely, a housing or base 12, and a cover assembly 14, which are joined together longitudinally with a hinge or hinge-like bendable mechanism 16 along one or both longitudinal sides 18 of the telephone 10. This configuration is dissimilar from the short-side, i.e., top or bottom end, hingedly-connected handsets which are popularly known as clamshell or flip telephones.

The arrangement of components between the two primary parts 12, 14, of the telephone 10 can vary. Typically, the first primary part, hereafter referred to as the housing or base 12, i.e. the part containing a display area 20, as well as the majority if not all of the electronics, user interface, speaker and/or microphone, will be more substantial. The other primary part or parts, hereafter referred to as a cover or cover assembly 14, will generally be more lean, not often including major componentry therewithin. However the cover assembly 14 may include one or more portions. For example, as shown and described for the primary preferred embodiments, a cover 14 may include respective side cover portions 14a and 14b. With two side cover portions 14a,14b, there are also two corresponding hinge or bendable mechanism portions 16a and 16b similarly being parts of a general overall hinge or bendable assemblage 16. The respective hinges or bendable portions 16a and 16b which connect the base 12 with the openable cover portions 14a and 14b are preferably positioned along respective longitudinal sides 18a and 18b of the telephone 10.

As introduced, the communication device or unit 10 is shown provided with a display area 20 operable under the cover assembly 14. It is furthermore shown by the distinctions between the respective FIGS. 1A and 1B; 2A and 2B; 3A and 3B; and 4A and 4B that the cover assembly 14, at least as represented by the respective side portions 14a,14b, therein, can be moved between respective closed and open positions. In each of the respective "A" FIGS. (1A, 2A, 3A and 4A), the cover assembly 14 is in a closed position, while it is in an open position in the respective "B" FIGS. (1B, 2B, 3B and 4B). The cover 14 thus alternately covers and exposes the width of the area 20. Note, the display area 20 may be of a type to relay information, such as about the status of the communication unit 10 or may be used for multimedia or interactive modes such as for input and/or output of information. Further descriptions of alternative utilization modes are set forth below.

As shown in FIGS. 1-4, a keypad 22 may be incorporated on the cover or cover portions 14, the keypad 22 being useful for entering information into the communication unit. When discrete cover portions, such as portions 14a and 14b are used, respective sets of function keys 22a and 22b may be separately included on the respective cover portions 14a and 14b. These keys 22a and 22b may then together define the keypad 22. With keys such as these are maintained exposed regardless the open or closed position of the cover 14, then, the phone 10 can be operable in either the open or closed position. A closed position operability may correspond with substantially normal phone and/or other intercommunication uses, with perhaps some display area usage; however, for more full display area uses, as may be desirable in multimedia or other interactive modes, the open position may be preferred. Note, the keys 22 or alternative additional keys or key equivalents in/on a touch sensitive display area 20 may be included in/on the base, in/on or adjacent the display.

Figure 5:
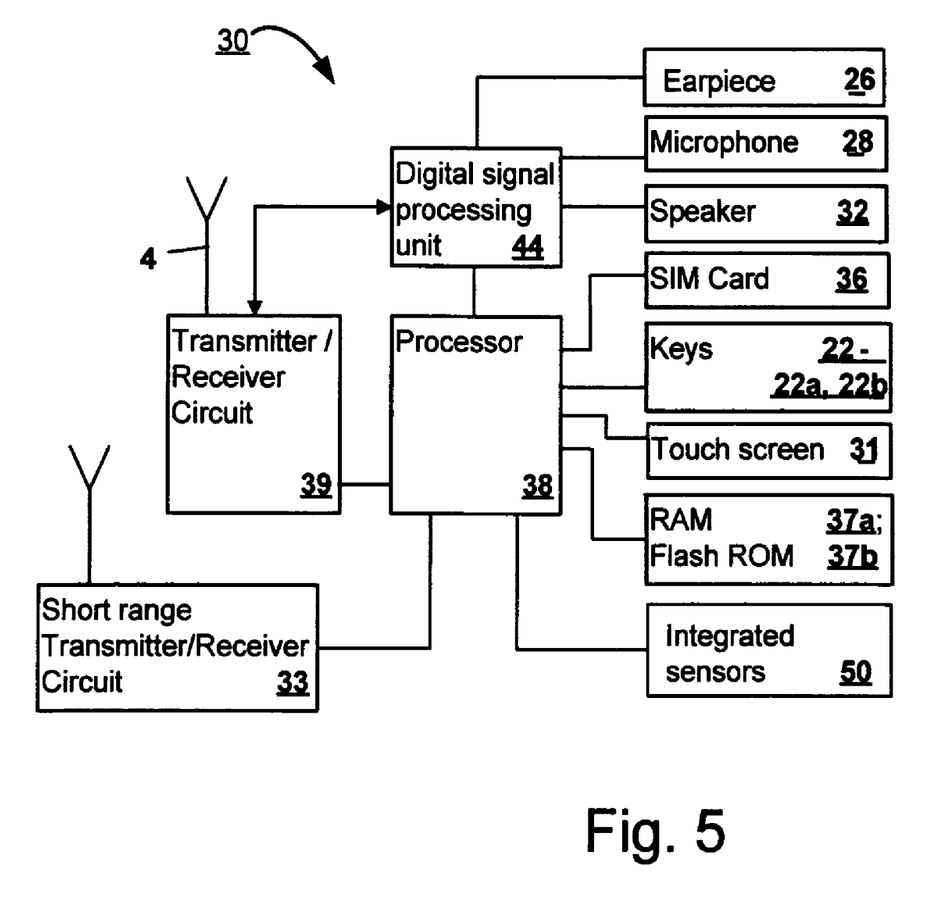
FIG. 5 is a block diagram illustrating the general architecture of a mobile phone in accordance with the present invention.

In the primary embodiment herein shown and described, the housing 12 may include the following components of a portable telephone or other communication unit: a display 20 as described above, for displaying information (whether on the status of the telephone, or of multimedia and/or interactive types); an internal compartment 24 (FIGS. 2B and 3B); a battery (not shown/separately identified) inside or to be disposed in the internal compartment 24; an antenna (not shown/separately identified); an earpiece 26; a microphone 28; a power switch (not shown/separately identified); a ringer (not shown/separately identified); and analog and/or digital processing means generally indicated by the reference numeral 30 (FIG. 5).

Though in the preferred embodiments these components 20 and 24-30 may be included in the housing or base 12 of the telephone, in one or more alternative embodiments, any one or more of these components may be included in the cover or covers 14 of the telephone. Further, though it may be possible to install any one or more of these components 20 and 24-30 in one or the other or both covers 14, the bulk of these components may be preferred to be installed in the base 12, because positioning of the bulkier components (e.g., the single most substantial component of the telephone often being the battery) in the base 12 allows the cover 14 or covers 14a,14b to be made smaller. Smaller covers may be desirable as these are movable, and smaller sizing may provide simplified movability, simplified openability relative to the housing part.

In the closed position as shown in the "A" FIGS. (1A, 2A, 3A and 4A), the cover 14 conceals a portion of the display 20 of the base 12, in many embodiments leaving some usable display area as well as the earpiece 26 and microphone 28 exposed for use even when in the closed position. As described above the keys 22 are also exposed, as is the power switch (not shown). Having these elements, particularly including a keypad 22 together with a power switch (which may or may not be a part of the keypad 22) exposed when the cover 14 is closed allows the user to switch the telephone on or off and otherwise use the phone without having to open the cover 14. Thus, in the closed position, the telephone 10 preferably remains operable, while when the telephone 10 is open, not only will the telephone remain operable, the display area is widened to give the user greater access thereto for any of a multitude of uses such as in multimedia or other interactive operations.

Note, the cover 14 may leave a substantial portion of the display openly accessible even when the cover is in closed position so that the display may be at least partially usable when the phone is closed. In an example, the display may be used for accessing simple, non-intricate text messages (SMS or e-mail) or the like during closed phone narrowed display usage, providing for the user to determine when and/or whether to open the phone for more complex information retrieval (as for example a graphic or pictorial or like attachment to the initial message, SMS or e-mail). As a further alternative, the cover 14 may be disposed to cover at least a substantial portion, or nearly all or all of the display area 20 when closed, retaining limited display usage, or eliminating as the alternative embodiment may dictate.

In normal use then, the telephone 10 may be maintained in the closed position in a great many circumstances, including when a call is to be made or answered, as well as enabling it to be carried conveniently and discreetly. With external keys 22 disposed on the covers 14 as shown and described above, the dialing of another party may in many such embodiments may be accomplished in either the closed position using the exposed buttons 22a and/or 22b of the keypad 22 or in the opened position wherein as the display area 20 is exposed, thus allowing the user to either enter a number directly with the numbered keys 22a and/or 22b of the keypad 22, or, or alternatively dial using the display, as in accessing a prestored number using the telephone's memory facility, or making use of a touch sensitive display (if used) to key in the appropriate number.

In any case, the "B" FIGS. (1B, 2B, 3B and 4B) also show a preferred embodiment of the full extent to which the cover 14 may be opened under normal use. Once opened in this way, the telephone 10 provides a widened viewing area 20. An open position with a wider viewing area of the display 20 allows improved access to the information input/output means and still provides a good mechanical connection between the cover and the main body of the unit. Thus, an advantage of a telephone according to the present invention is that of a small telephone which is adapted to have a widened display area upon command.

In a more detailed view of a preferred alternative embodiment, a pair of hinged cover members 14a and 14b may be connected to/with the housing 12 via a hinge assembly 16. The first cover member 14a (shown on the left side in the drawings, FIGS. 1-4) is pivotally connected to the first longitudinal side 18a of the housing 12 via hinge portion 16a, while the right cover member 14b is pivotally connected to the second longitudinal side 18a of the housing 12 via hinge portion 16b, both preferably at or along the respective bottom edges of the respective longitudinal sides 18a, 18b of housing 12. These bottom edges may thus define the pivotal axes about which the cover members 14 may be pivotally movable. This arrangement, particularly with the substantially inverted L-shaped members 14a, 14b enables the cover members 14a, 14b to closely follow the shape of the housing 12, particularly as the substantially flat top surfaces of the inverted L-shaped members 14a, 14b (the surfaces which in the drawings have the buttons 22 defined therein) follow the substantially flat top surface of the display 20. The inverted L-shaped members 14a, 14b may also be referred to as wings 14a and 14b, which wings may fly outwardly to the open position. The substantially flat top portions of the wings 14a, 14b may, particularly with data buttons or keys 22 incorporated thereon, then be referred to as input panels, or the like.

Note, the "hinges" 16a, 16b which connects the base and the cover members may be of a spindle type, and/or may be spring-loaded (see below) or may more simply be a bendable portion of an integral connection of the housing and each of the wings 14a, 14b.

FIG. 4 shows a more specific example of what a typical view of the display may be in the alternate closed and open positions. Note, the display may be operable in portrait or landscape or any other mode, and/or may be switchable therebetween.

It should be noted that any feature may be used which allows for the application of an appropriate opening and/or closing force to move the cover(s) to open and/or close. In an example, with the telephone held firmly by the base 12, a force may be applied to one or the other or both covers 14. The effect of the force is to produce a turning moment about the axis of the hinges connecting the covers 14 and base 12 of the telephone 10. This turning moment acts to move the top flat portions of the cover 14 away from the center of the display area of the base 12 and hence opens the telephone 10. The hinge mechanism may be spring-loaded to thus assist the user in opening and/or closing the telephone.

In some embodiments, the cover 14 may be biased, using resilient means such as springs for example, within, as part of or connected to the hinge mechanism, towards the open and/or the closed position. Such a spring bias may be toward a locked position of the cover, preferably toward closed, though alternatively to open. A release mechanism may be included which when released, the cover assembly may be moved by the biased spring or other resilient means to the biased position.

It may further be possible to configure the hinge such that a button may be pressed to automatically open the handset. However, in many embodiments, in order to move the cover completely from the closed position to the open position, a continuous turning moment may be applied throughout all intermediate positions between open and closed.

FIG. 5 illustrates, in block diagram form, the hardware architecture of a mobile phone 10 constructed in accordance with the present invention. A processor 38 controls the communication with the cellular network via the transmitter/receiver circuit 39 and an internal antenna 40. A microphone 28 receives and transforms the user's speech into analogue signals, the analogue signals formed thereby are A/D converted in an A/D converter (not shown) before the speech is encoded in a digital signal processing unit 44 (DSP). The encoded speech signal is transferred to the processor 38, which e.g. supports the GSM terminal software. The processor 38 also forms the interface to the peripheral units of the apparatus, including a RAM memory 37a and a Flash ROM memory 37b, a SIM card 36, the touchscreen 31, the Pop-Port™, the sensors 50, the short range (Bluetooth®) transmitter/receiver 33 and the keys 22, 22a and 22b (as well as data, power supply, etc.). The digital signal-processing unit 44 speech-decodes the signal, which is transferred from the processor 38 to the earpiece 26 or the hands free speaker 32 via a D/A converter (not shown).

Figure 1A:
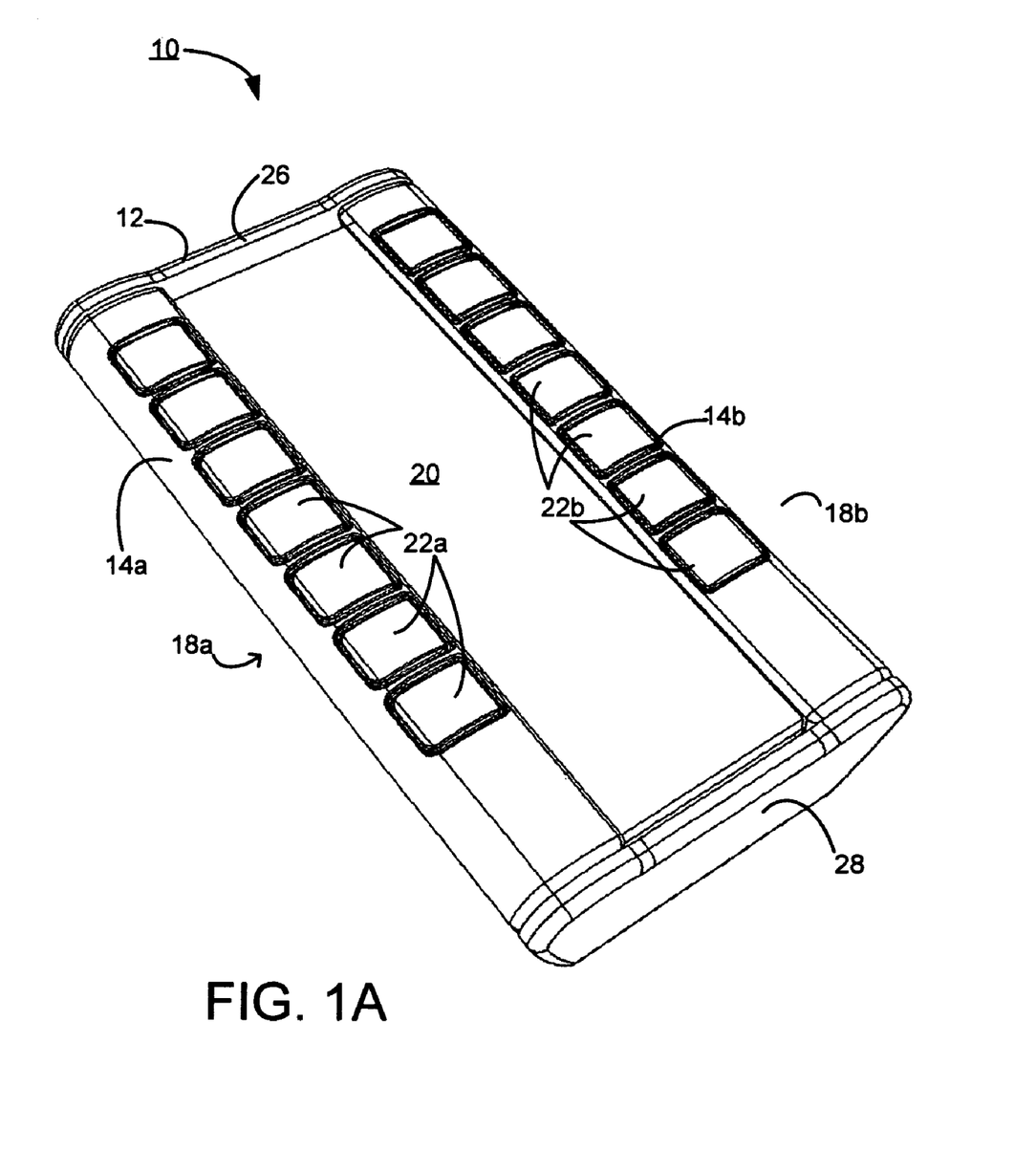
FIG. 1A shows an isometric view of a mobile communication unit hereof in a closed position.
Figure 1B:
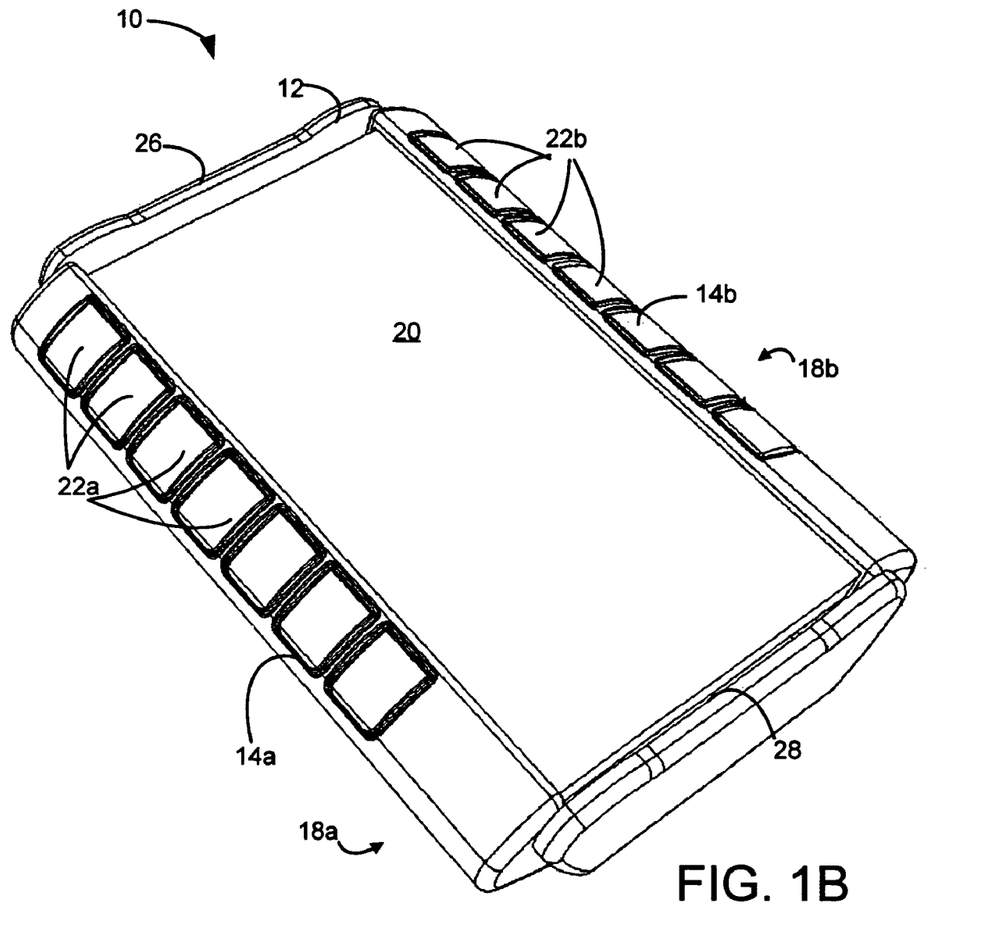
FIG. 1B shows another isometric view of a mobile communication unit hereof, here in an open position.
Figure 2A:
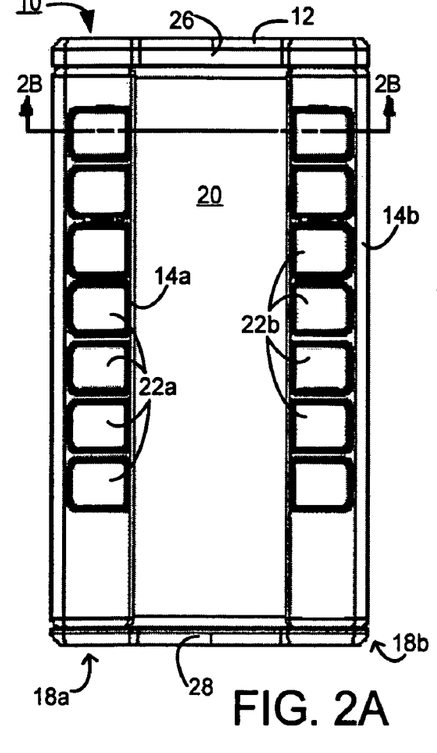
FIG. 2A shows a plan view of a mobile communication unit hereof in the closed position.
Figure 2B:
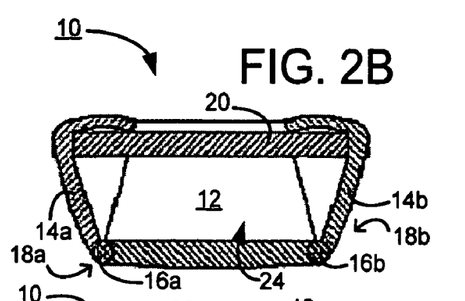
FIG. 2B shows a cross-sectional view of a mobile communication unit hereof in the closed position, taken as along line 2B-2B of FIG. 2A.
Figure 3A:
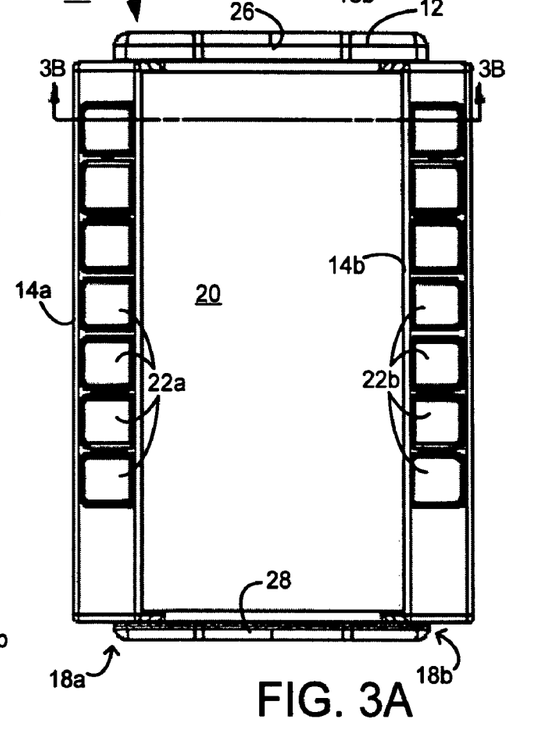
FIG. 3A shows a plan view of a mobile communication unit hereof in the open position.
Figure 3B:
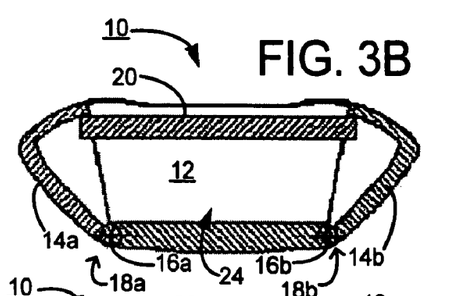
FIG. 3B shows a cross-sectional view of a mobile communication unit hereof in the open position, taken as along line 3B-3B of FIG. 3A.
Figure 4A:
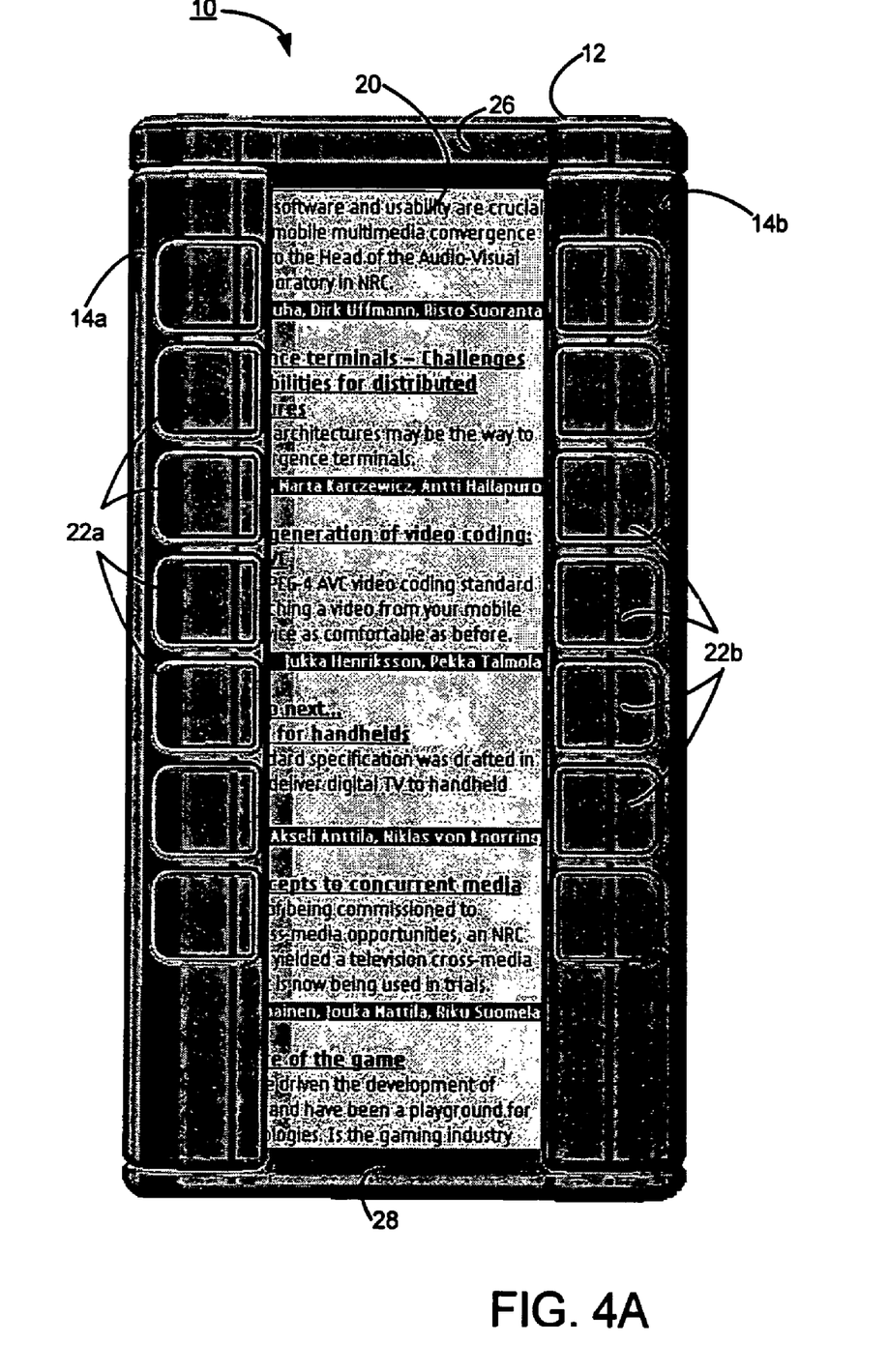
FIG. 4A shows another plan view of a mobile communication unit hereof in the closed position.
Figure 4B:
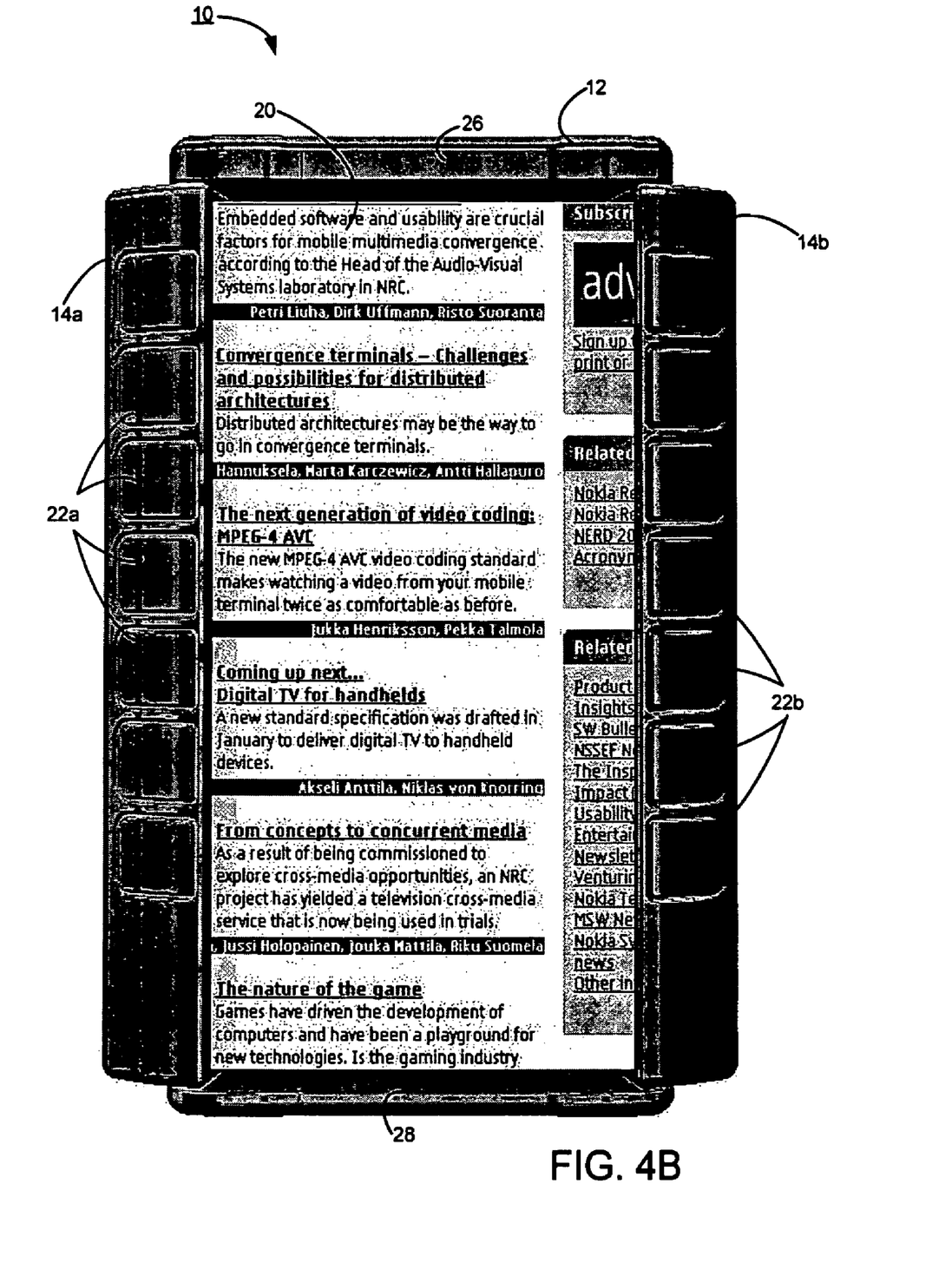
FIG. 4B shows yet another plan view of a mobile communication unit hereof in the open position showing a widened display area; and, FIG. 4C shows a plan view of a mobile communication unit hereof in the closed position.
Figure 4C:
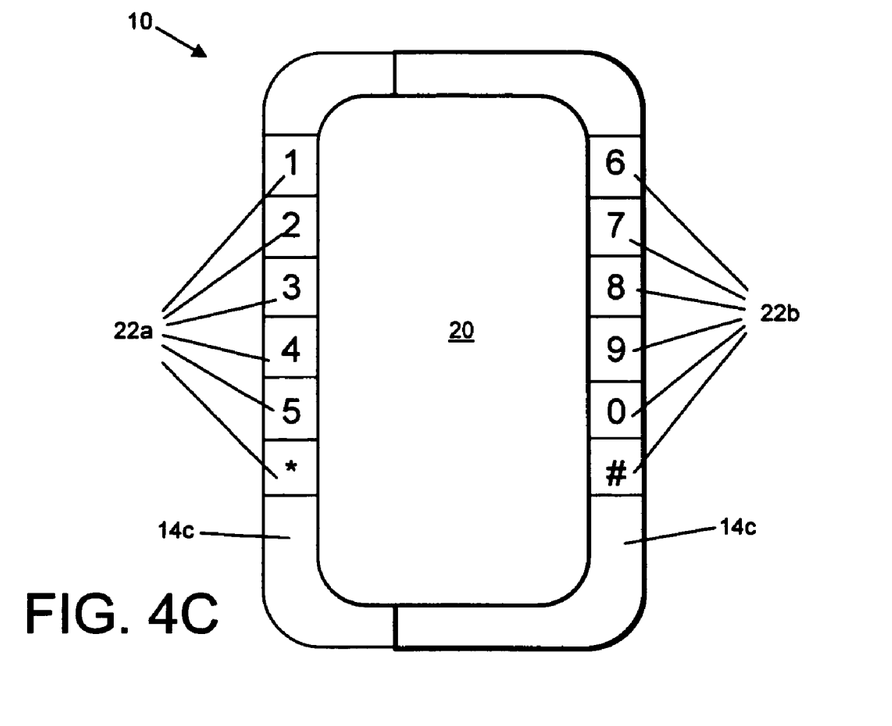
Figure 4D:
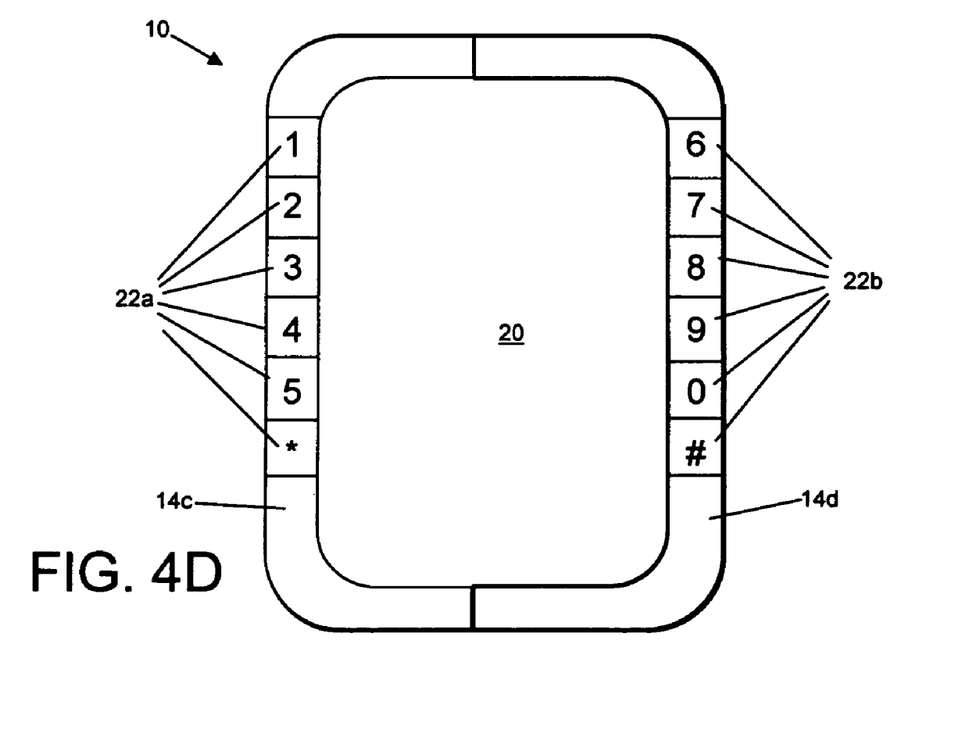
FIG. 4D shows a plan view of a mobile communication unit hereof in the open position.

FIGS. 4C and 4D illustrate another preferred embodiment in which two covers assemblies 14c and 14d are each slidably connected to a central housing or base of the phone (not shown) which also holds the display 20. Numbered or alphanumeric keys 22a and 22b are provided on the cover assemblies 14c and 14d. In the retracted position of FIG. 4C the cover assemlbies obscure a part of the display 20 whilst the complete display 20 is visible in the extended deposition of the cover assemblies shown in FIG. 4D. The movement of the cover assemblies can be controlled by the use of a slide/leaf spring as described in U.S. patent application with Ser. No. 10/873,565, hereby incorporated by reference FIG. 5 schematically shows important parts of a preferred embodiment of the phone. The preferred embodiment of the phone of the invention is adapted for use in connection with the GSM network, but, of course, the invention may also be applied in connection with other phone networks. It could be cellular networks, various forms of cordless phone systems or in dual band phones accessing sets of these systems/networks. The controller 38 is connected to the user interface. Thus, it is the controller 38, which monitors the activity in the phone and controls the display 20 in response thereto. Therefore, it is the controller 38, which detects the occurrence of a state change event and changes the state of the phone and thus the display text. The user may cause a state change event when he activates the keypad 22, including the function key and the navigation key, and these types of events are called entry events or user events. However, the network communicating with the phone may also cause a state change event. These type of events and other events beyond the user's control are called non-user events. Non-user events comprise status change during call set-up, change in battery voltage, change in antenna conditions, message on reception of SMS, etc.

The present invention includes any novel feature or combination of features disclosed herein either explicitly or any generalization thereof irrespective of whether it relates to the claimed invention or mitigates any or all of the problems addressed. In view of the foregoing description it will be evident to a person skilled in the art that various modifications may be made within the scope of the invention. The invention is not limited to embodiments described above and illustrated in the drawings, but can be varied within the scope of the appended claims.

The invention claimed is:

1. A mobile communication unit comprising:
   a housing having at least one longitudinal side and a display area; and,
   at least one pivotably movable cover assembly longitudinally connected to a bottom edge of a respective one of the at least one longitudinal side of the housing where each bottom edge defines a pivotal axis, said cover assembly being pivotably movable about the pivotal axis in a latitudinal direction between a closed position and an open position relative to said housing and said display area;

wherein pivotal movement of said cover assembly in the latitudinal direction from the closed position to the open position provides widened access to the display area of the housing.

2. A mobile communication unit as claimed in claim 1 wherein the housing has two longitudinal sides and wherein the cover assembly comprises two longitudinally hinged cover members, each of said two longitudinally hinged cover members being pivotably connected to a respective one of said two longitudinal sides of said housing.

3. A mobile communication unit as claimed in claim 1 wherein the cover assembly has one or more functional keys defined therein.

4. A mobile communication unit as claimed in claim 1 wherein the housing has two longitudinal sides and wherein the cover assembly comprises two longitudinally hinged cover members, each of said two longitudinally hinged cover members being pivotably connected to a respective one of said two longitudinal sides of said housing, and, wherein each of said two longitudinally hinged cover members has one or more functional keys defined therein.

5. A mobile communication unit as claimed in claim 1 wherein the communication unit is configured to operate in either or both the closed or open position.

6. A mobile communication unit as claimed in claim 5 wherein the cover assembly has one or more functional keys defined therein, the one or more function keys being configured to operate in either or both the closed or open position.

7. A mobile communication unit as claimed in claim 6 wherein when in the closed position, the cover assembly is disposed to cover at least a portion of the display area, and wherein the one or more keys are freely accessible on the cover assembly.

8. A mobile communication unit as claimed in claim 7 wherein the display area is configured to operate in either or both the closed or open position.

9. A mobile communication unit as claimed in claim 8 wherein the display area is configured to operate in a first mode in the closed position and in a second mode in an open position.

10. A mobile communication unit as claimed in claim 8 wherein the display area is configured to provide either or both an input function and an output function.

11. A mobile communication unit as claimed in claim 1 wherein the at least one pivotal axis defines a longitudinal axis of pivotal rotation of the cover assembly relative to the housing.

12. A mobile communication unit as claimed in claim 1 wherein the cover assembly is hingedly-attached by an integral bendable sidewall part of the housing.

13. A mobile communication unit as claimed in claim 1 wherein the attachment for rotation between the base and the cover is one or more of a hinge, a spring-biased connection, or resilient connection.

14. A mobile communication unit as claimed in claim 1 wherein the cover assembly comprises at least one inverted L shaped member, the inverted L shaped member having a substantially flat top portion which is adapted to cover at least a portion of the display area.

15. A method for operating a mobile communication unit comprising:
providing a mobile unit having a base and at least one pivotably movable cover member connected to a bottom edge of at least one longitudinal side of the base, where the bottom edge defines at least one pivotal axis, the pivotably movable cover member being adapted to alternately at least partially cover and expose a display area of the base as the cover member is moved in a latitudinal direction relative to the base;
operating the mobile communication unit in a first mode with the pivotably movable cover member disposed in a first position at least partially covering the display area of the base;
pivotally moving the cover member to a second position exposing the display area of the base; and,
operating the mobile communication unit in a second mode with the cover member disposed in the second position.

16. A method according to claim 15 wherein the second position of the cover member relative to the display area provides a wider viewable area of the display area than the first position.

17. A method according to claim 15 wherein the first mode of operation includes one or both of communicating telephonically and retrieving visual display information via the display area.

18. A method according to claim 15 wherein the second mode of operation includes one or both of communicating telephonically and retrieving visual display information via the display area.

19. A mobile telephone comprising:
a base structure;
a display area formed in the base;
a speaker formed in the base;
a microphone formed in the base;
an antenna connected within the base;
either or both analog and digital processing means; and,
respective first and second side cover portions connected via corresponding first and second bendable portions to respective bottom edges of longitudinal sides of the base, where the respective bottom edges define pivotal axes; the first and second side cover portions each having at least one functional control key defined thereon;
the first and second side cover portions being pivotably movable about a respective one of the pivotal axes between a closed position and an open position in a latitudinal direction relative to said base and said display area, wherein pivotal movement of said cover portions from the closed position to the open position provides widened access to the display area of the base.

* * * * *